(12) United States Patent
Schneider

(10) Patent No.: US 9,717,254 B2
(45) Date of Patent: Aug. 1, 2017

(54) QUICK CUTTER

(71) Applicant: Kharis Schneider, Philadelphia, PA (US)

(72) Inventor: Kharis Schneider, Philadelphia, PA (US)

(*) Notice: Subject to any disclaimer, the term of this patent is extended or adjusted under 35 U.S.C. 154(b) by 7 days.

(21) Appl. No.: 14/204,665

(22) Filed: Mar. 11, 2014

(65) Prior Publication Data

US 2014/0260847 A1     Sep. 18, 2014

Related U.S. Application Data

(60) Provisional application No. 61/782,452, filed on Mar. 14, 2013.

(51) Int. Cl.
*A21C 11/10* (2006.01)

(52) U.S. Cl.
CPC ......... *A21C 11/106* (2013.01); *Y10T 83/0429* (2015.04); *Y10T 83/9372* (2015.04)

(58) Field of Classification Search
CPC ......... A21C 11/106; A21C 3/02; A21C 11/10; Y10T 83/9372; Y10T 83/0429; Y10T 29/49549; Y10T 83/937; Y10S 83/935
USPC ..... 30/305; 99/537; 425/196, 194, 298, 310, 425/363
See application file for complete search history.

(56) References Cited

U.S. PATENT DOCUMENTS

| | | | | |
|---|---|---|---|---|
| 641,725 A | * | 1/1900 | Peters | B29C 51/32 425/289 |
| 1,177,931 A | * | 4/1916 | Coleman | B27B 25/02 144/250.1 |
| 1,382,677 A | * | 6/1921 | Schmitz | A21C 11/106 30/306 |
| 1,855,663 A | * | 4/1932 | Bregman | A21C 5/00 30/306 |
| 3,680,419 A | * | 8/1972 | Stoop | B26D 7/1854 83/216 |
| 3,812,782 A | * | 5/1974 | Funahashi | B41F 31/22 101/367 |
| 5,388,489 A | * | 2/1995 | Dayley | A21C 11/04 425/294 |
| 5,452,634 A | * | 9/1995 | Wilson | B26D 7/1854 83/346 |
| 5,576,033 A | * | 11/1996 | Herrera | A21C 11/004 425/217 |
| 6,280,371 B1 | * | 8/2001 | Krippelz | B23P 15/00 29/895.213 |
| 6,851,192 B2 | * | 2/2005 | So | A21C 11/106 30/299 |
| 8,033,973 B1 | * | 10/2011 | Evans | B26D 7/06 226/190 |
| 8,647,104 B1 | * | 2/2014 | Tillman | A21C 11/106 425/235 |

(Continued)

FOREIGN PATENT DOCUMENTS

JP    2008062362 A  *  3/2008  ............... B26D 7/18

OTHER PUBLICATIONS

"Cake Cutter Photos"—dated Jan. 1, 2012.

*Primary Examiner* — Ghassem Alie
(74) *Attorney, Agent, or Firm* — Volpe and Koenig, P.C.

(57) ABSTRACT

A cutting tool for producing decorative cake components is provided. The cutting tool includes a roller including a plurality of cutters located on a radial outer surface thereof and two end portions located on opposite ends of the roller.

20 Claims, 4 Drawing Sheets

(56) References Cited

U.S. PATENT DOCUMENTS

| | | | |
|---|---|---|---|
| 2005/0153023 A1* | 7/2005 | Overton | A21C 11/106 426/94 |
| 2010/0159095 A1* | 6/2010 | Suski | A21C 11/04 426/383 |
| 2010/0227024 A1* | 9/2010 | Flores | A21C 14/00 426/87 |

* cited by examiner

QUICK CUTTER

INCORPORATION BY REFERENCE

The following documents are incorporated herein by reference as if fully set forth: U.S. Provisional Application No. 61/782,452, filed Mar. 14, 2013.

FIELD OF INVENTION

This application is generally related to pastry tools and more particularly related to a decorative element cutting tool.

BACKGROUND

Cakes and other pastries may be decorated with intricate sugar flowers or other decorative elements. Existing tools for producing these decorative elements require a user to press a cutting tool into a layer of a mixture of fondant, gum paste, or similar food mixture to form each individual decorative element. Cutters with plungers for extraction after formation of the decorative elements allow users to release the formed decorative elements and any excess material that may get stuck in the tool. This process is time consuming because the user can only form a single decorative element at a time and must check the cutter after forming each decorative element to ensure none of the mixture is stuck or clogging the cutter.

It would be desirable to provide a tool that can simultaneously produce multiple decorative elements and is simple to clean.

SUMMARY

A cutting tool for producing decorative cake components is provided. The cutting tool includes a roller including a plurality of cutters located on a radial outer surface thereof and two end portions located on opposite ends of the roller.

A method of producing multiple decorative elements is also provided. The method comprises flattening a food ingredient mixture into a substantially flat layer. A cutting tool is rolled over the flattened layer. The cutting tool includes a plurality of cutters, each of the cutters is defined by a continuous blade encompassing an area, which can be for example, a decorative form, each of the blades extend radially outwardly from a base on the radial outer surface of the roller such that a centerline of a cross-section through the blade at any position along its continuous length lies along a ray extending from the longitudinal axis of the roller, the blade has an inner blade wall and an outer blade wall that diverge toward the base. The method includes cutting the mixture with the plurality of cutters located on the radial outer surface of the roller, and forming the decorative elements by the plurality of cutters. The decorative elements are released from the plurality of cutters after being formed.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
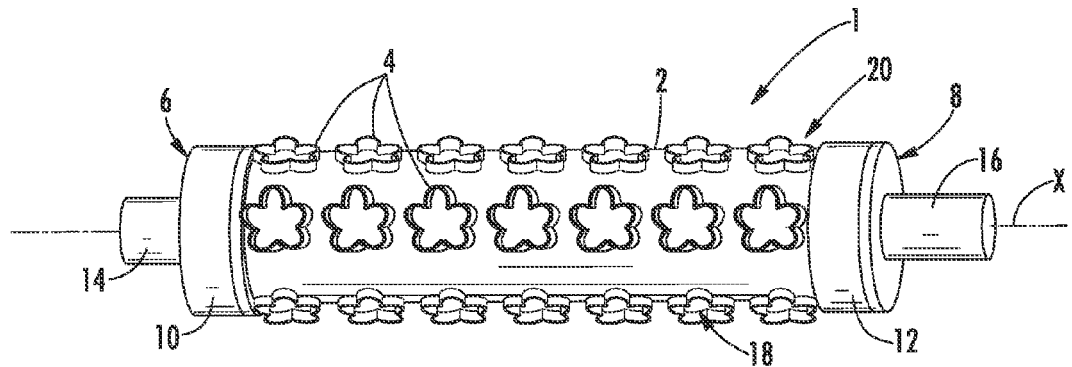
FIG. 1 is a perspective view of a cutting tool according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 shows a preferred embodiment of the cutting tool 1 according to the present invention. In the example embodiment shown, the cutting tool 1 includes a roller 2 having a plurality of cutters 4 located on a radial outer surface. The tool 1 includes two end portions 6, 8 located on opposite ends of the roller 2. The roller 2, the plurality of cutters 4, and the end portions 6, 8 may be plastic or any other suitable material. The roller 2 preferably has a hollow center, and the plurality of cutters 4 may define passages 24 in communication with the hollow center of the roller 2. The hollow center and the passages 24 allow a user to access the cutters 4 if any food ingredient mixture gets stuck in the cutters 4. The hollow center and passages 24 also allow for easy cleaning of the cutting tool 1. Alternatively, no passages in communication with the hollow center are needed.

Figure 3:
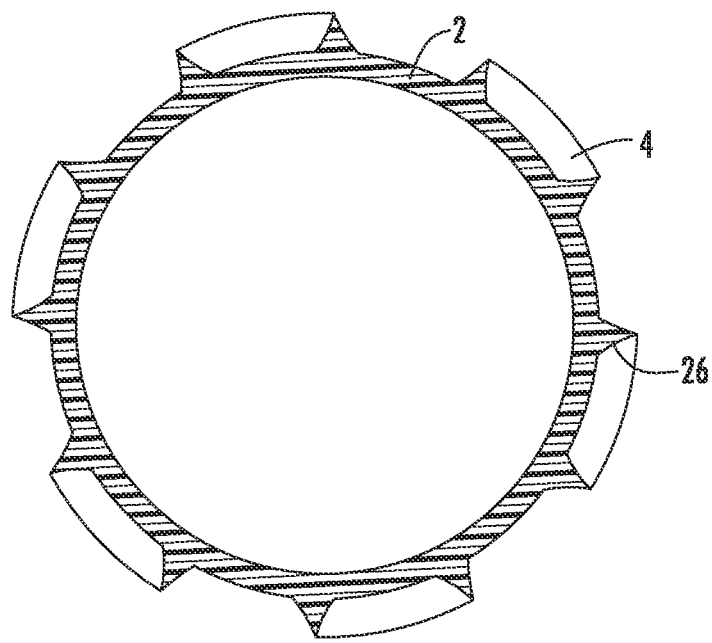
FIG. 3 is a cross-sectional view of a roller according to the invention.

As shown in FIG. 3, the roller 2 and cutters 4 may be integrally formed. A radially outer edge of the plurality of cutters 4 preferably has a radius of curvature centered about a longitudinal axis X of the roller 2 which allows the roller 2 to smoothly roll over a layer of food ingredient and reduce irregularities in the decorative elements.

Figure 2:
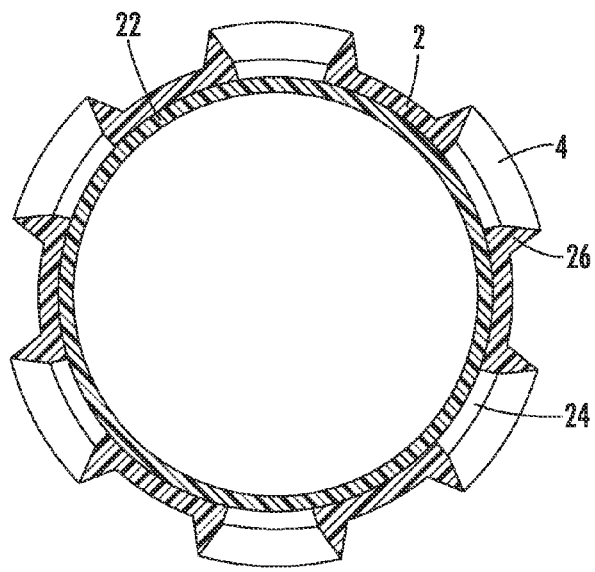
FIG. 2 is a cross-sectional view of a roller with a sleeve inserted in a hollow center of the roller according to the invention.

As shown in FIG. 2, a sleeve 22 having a smaller diameter than the hollow center of the roller 2 can be arranged within the roller 2. The sleeve 22 provides a barrier for any excess food ingredient mixture that is forced through cutter passages 24 to the hollow center of the roller 2. The sleeve 22 preferably prevents excess food ingredient mixture from entering and getting stuck in the hollow center of the roller 2.

Figure 8:
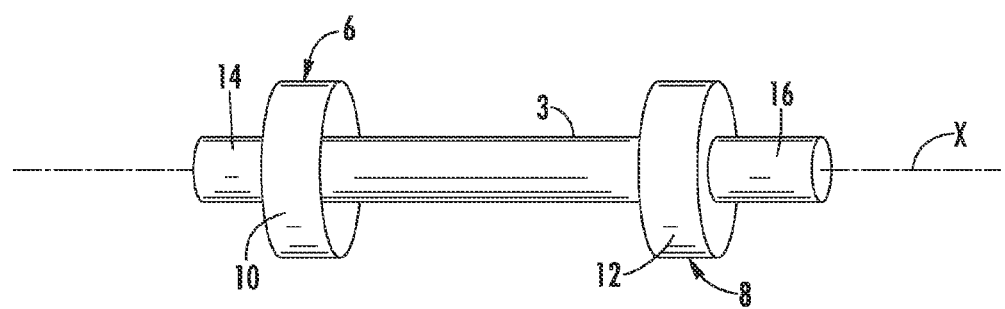
FIG. 8 is a perspective view of the cutting tool according to an embodiment of the invention with a shaft extending between end portions of the cutting tool.

Each of the end portions 6, 8 optionally is formed as a cap 10, 12 that matingly engages a respective one of the ends of the roller 2, and a handle 14, 16 that engages each of the caps 10, 12. At least one of the end portions 6, 8 is removably coupled to the roller 2. The end portions 6, 8 may be removed for cleaning the hollow center of the roller 2. The caps 10, 12 may engage the ends via a threaded connection, snap connections, or any other suitable fastening arrangement. Each of the handles 14, 16 may slidably lock into a slot formed in a respective cap 10, 12. The roller 2 preferably is rotatable relative to the handles 14, 16. As shown in FIG. 8, in a further alternative embodiment, the end portions 6, 8 can be connected to a shaft 3 that rotates relative to the roller 2. Each of the end portions 6, 8 can include threaded portions configured to mate with a corresponding threaded end of the shaft 3. In another embodiment, the shaft 3 can extend through the handles 14, 16 and can be supported via bearings in the handles 14, 16. The shaft 3 is preferably formed from metal or any other suitable material to provide additional stability to the cutting tool 1 when rolling along a surface.

The plurality of cutters 4 may be arranged in parallel rows 18, 20 on the radial outer surface of the roller 2. The plurality of cutters 4 may differ in size or shape between the rows 18, 20. The plurality of cutters 4 in a first row 18 may differ in size or shape from a second plurality of cutters in a second row 20. The cutters 4 within any given row may incrementally increase in size along the longitudinal axis X of the roller 2.

Figure 7:
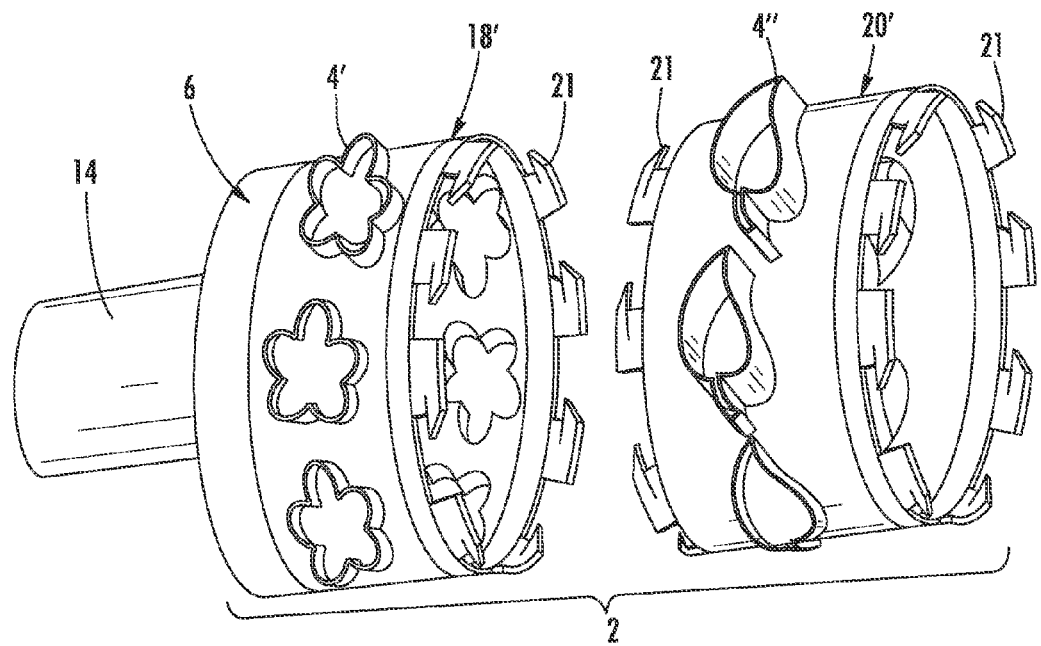
FIG. 7 is a perspective view of the cutting tool according an embodiment of the invention with interchangeable rows of cutters.

In one preferred configuration shown in FIG. 7, the roller 2 is comprised of a plurality of individual rows 18', 20' of cutters 4', 4" with varying shapes and/or sizes. The plurality of individual rows 18', 20' can be connected to each other and to the end portions 6, 8 via a threaded connection, snap connections, or any other suitable fastening element 21. As shown in FIG. 7, the fastening element 21 can include hooked prongs, which can engage within a corresponding groove or with a hooked prong on a mating part. FIG. 7 shows two rows 18', 20' immediately prior to fastening with one another, however one of ordinary skill in the art recognizes any number of individual rows can be linked to one another and can be connected between the end portions 6, 8 of the cutting tool 1. While one row 18' including the handle 14 on one end is shown, those skilled in the art will understand from the present disclosure that an additional row with the opposite handle 16 is required to complete the roller.

Figure 4:
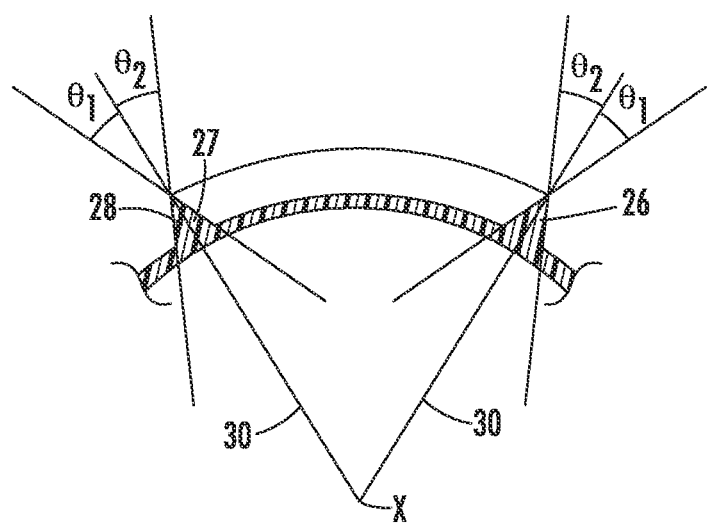
FIG. 4 is an enlarged view of one cutter blade from FIG. 3.

As shown in FIG. 4, each of the cutters 4 is preferably defined by a continuous blade 26 encompassing an area. The area defines the shape of the decorative food ingredient elements. Each of the blades 26 extends radially outwardly from a base located on the radial outer surface of the roller 2 such that a centerline 30 of a cross-section through the blade 26 at any position along its continuous length lies along a ray extending from the longitudinal axis X of the roller 2. The blade 26 has an inner blade wall 27 and an outer blade wall 28 that diverge toward the base. The degree of divergence between the inner wall 27 from the centerline 30 is defined as a release angle θ1 and the divergence between the outer wall 28 from the centerline 30 is defined as a release angle θ2. The release angles θ1, θ2 of the inner wall 27 and the outer wall 28 may both be at least 2°. The release angles θ1, θ2 may differ for the inner wall or outer wall 27, 28. The release angles θ1, θ2 may be smaller or larger depending on the consistency of the food ingredient mixture or the shape of the cutter.

Figure 5:
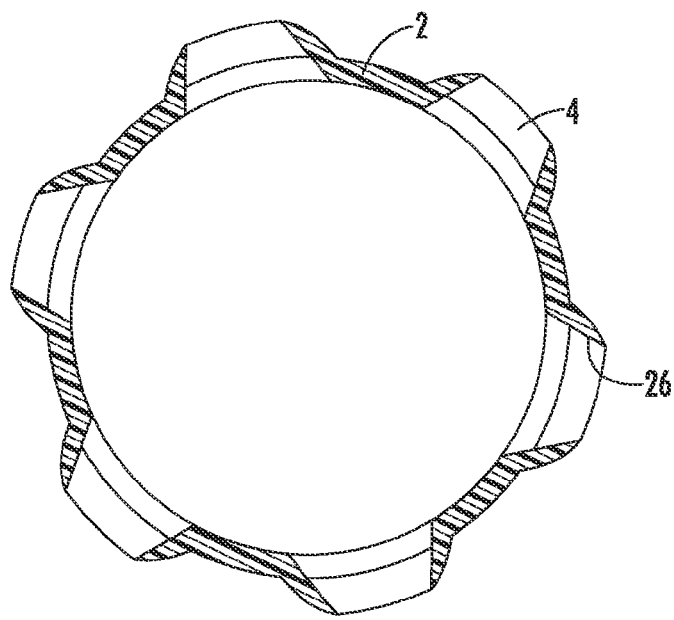
FIG. 5 is a cross-sectional view of a roller according to the invention.
Figure 6:
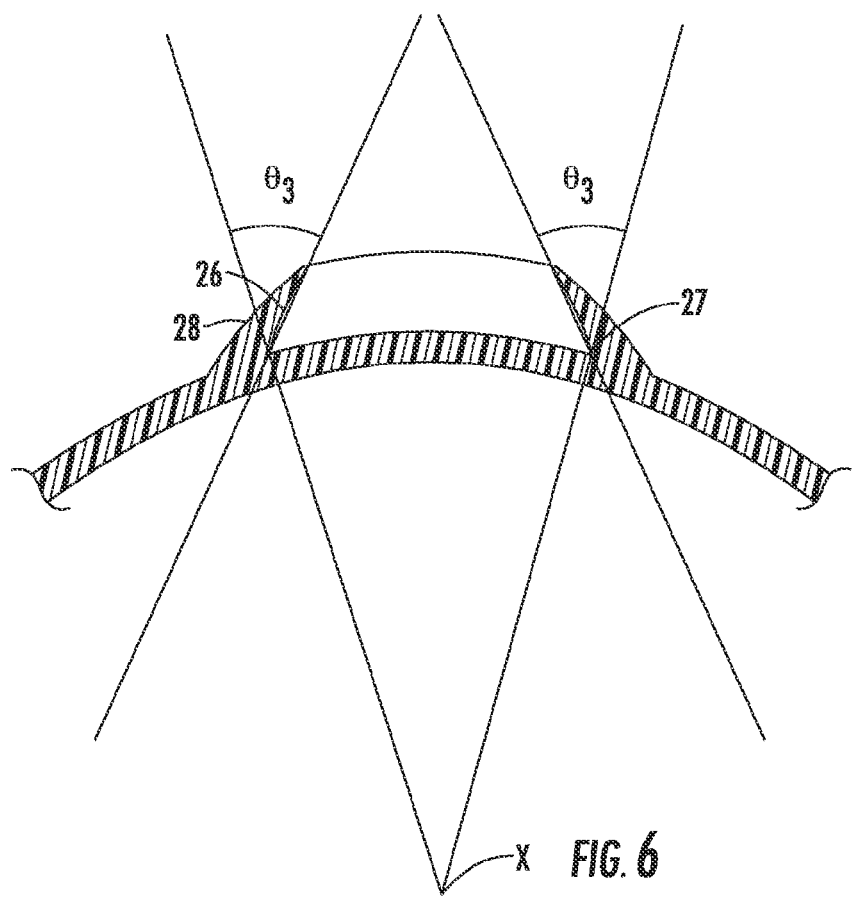
FIG. 6 is an enlarged view of one cutter blade from FIG. 5.

As shown in FIGS. 5 and 6, in an other embodiment, the inner blade wall 27 of each of the cutters is angled inwardly such that there is a positive angle between the inner blade wall 27 and a ray extending from the longitudinal axis X of the roller 2 that extends through a point defined at a base of each of the inner blade walls 27. This angle is defined as a cutter angle θ3. The cutter angle θ3 is a positive value which allows the cutting tool 1 to retain the decorative elements after forming. The decorative elements are pressed into the hollow center of the cutting tool 1 after forming, and can be removed after rolling over a layer of food ingredient mixture by removed an end portion 6, 8 of the cutting tool 1.

Having thus described various embodiments of the present cutting tool in detail, it is to be appreciated and will be apparent to those skilled in the art that many changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1 Cutting Tool
2 Roller
3 Shaft
4, 4' Plurality of Cutters
6, 8 End Portions
10, 12 Caps
14, 16 Handles
18, 18', 20, 20' Rows of Cutters
21 Fastening Element
22 Sleeve
24 Passages
26 Blade
27 Inner Wall
28 Outer Wall
30 Centerline of Blade
θ1 Release Angle of Inner Wall
θ2 Release Angle of Outer Wall
θ3 Cutter Angle
X Longitudinal Axis of Roller

What is claimed is:

1. A cutting tool for producing decorative pastry components comprising:
   a roller including a plurality of rings, each separate ring of the plurality of rings defined by a hollow annular outer body arranged around a rotational axis of the roller,
      each one of the plurality of rings including a plurality of cutters located on a radial outer surface thereof and extending radially outwardly from the radial outer surface of the plurality of rings,
      each one of the plurality of cutters defines a complete, closed decorative shape that is configured to cut decorative pastry components,
      each one of the plurality of cutters includes an unobstructed through passage to a common center chamber defined inside the hollow annular outer bodies of the plurality of rings, the common center chamber collects decorative pastry components cut by the complete, closed decorative shapes defined by the plurality of cutters, and the common center chamber extends continuously inside the plurality of rings, and
   two end portions located on opposite ends of the roller, wherein the plurality of rings are connected to one another and the end portions via fasteners formed on both axial ends of the rings around a periphery of the rings.

2. The cutting tool of claim 1, wherein the roller has a hollow center and the plurality of cutters define passages in communication with the hollow center of the roller.

3. The cutting tool of claim 2, wherein a sleeve having a smaller diameter than the hollow center of the roller is arranged within the roller.

4. The cutting tool of claim 1, wherein each of the end portions includes a cap that matingly engages a respective one of the ends of the roller and a handle that engages each of the caps.

5. The cutting tool of claim 4, wherein the roller rotates relative to the handles.

6. The cutting tool of claim 1, wherein at least one of the end portions is removably coupled to the roller.

7. The cutting tool of claim 1, wherein a radially outer edge of the plurality of cutters has a radius of curvature centered about a longitudinal axis of the roller.

8. The cutting tool of claim 1, wherein the roller, the plurality of cutters, and the end portions are plastic.

9. The cutting tool of claim 1, wherein the end portions are connected by a shaft extending through the roller that rotates relative to the roller.

10. The cutting tool of claim 1, wherein the plurality of cutters are arranged in parallel rows on the radial outer surface of the roller.

11. The cutting tool of claim 10, wherein the plurality of cutters differ in size or shape between the rows.

12. The cutting tool of claim 10, wherein the plurality of cutters in a first row differ in size or shape from a second plurality of cutters in a second row.

13. The cutting tool of claim 1, wherein each of the cutters is defined by a continuous blade encompassing an area, each of the blades extending radially outwardly from a base on the radial outer surface of the roller such that a centerline of a cross-section through the blade at any position along its continuous length lies along a ray extending from the longitudinal axis of the roller, the blade having an inner blade wall and an outer blade wall that diverge toward the base.

14. The cutting tool of claim 13, wherein the inner wall diverges from the centerline by at least 2°.

15. The cutting tool of claim 13, wherein the outer wall diverges from the centerline by at least 2°.

16. The cutting tool of claim 1, wherein an inner blade wall of each of the cutters is angled inwardly such that there is a positive angle between the inner blade wall and a ray extending from the longitudinal axis of the roller that extends through a point at a base of each of the inner blade walls.

17. The cutting tool of claim 1, wherein at least one of the fasteners extends axially from at least one of the axial ends of the hollow annular outer bodies of the plurality of rings.

18. The cutting tool of claim 17, wherein at least one of the fasteners comprises a plurality of grooves and hooked prongs, and the plurality of hooked prongs extend axially from at least one of the axial ends of the hollow annular outer bodies of the plurality of rings.

19. The cutting tool of claim 1, wherein the through passages each have a profile defined by the cutters.

20. A method of producing multiple decorative elements by the cutting tool according to claim 1, the method comprising: flattening a food ingredient mixture into a substantially flat layer; rolling the cutting tool over the flattened layer; cutting the mixture with the plurality of cutters located on the radial outer surface of the roller, and forming the decorative elements by the plurality of cutters; and releasing the decorative elements from the plurality of cutters after being formed.

* * * * *